United States Patent [19]
DuBois

[11] Patent Number: 5,336,726
[45] Date of Patent: Aug. 9, 1994

[54] BUTADIENE POLYMERS HAVING TERMINAL SILYL GROUPS

[75] Inventor: Donn A. DuBois, Houston, Tex.

[73] Assignee: Shell Oil Company, Houston, Tex.

[21] Appl. No.: 29,866

[22] Filed: Mar. 11, 1993

[51] Int. Cl.$^5$ ............................................ C08F 297/04
[52] U.S. Cl. .................................... 525/272; 525/288
[58] Field of Search ............... 525/250, 271, 314, 315, 525/272, 288

[56] References Cited

U.S. PATENT DOCUMENTS

| Re. 27,145 | 6/1971 | Jones . |
| 3,415,898 | 12/1968 | Walker . |
| 3,652,732 | 3/1972 | Makowski et al. . |
| 3,770,698 | 11/1973 | Riew . |
| 3,935,342 | 1/1976 | Lim . |
| 3,994,868 | 11/1976 | Inomata et al. . |
| 4,020,125 | 4/1977 | Suzuki et al. . |
| 4,028,485 | 6/1977 | Poloso et al. . |
| 4,039,593 | 8/1977 | Kamienski et al. . |
| 4,079,098 | 3/1978 | Rossmy et al. . |
| 4,417,029 | 11/1983 | Milkovich . |
| 4,507,430 | 3/1985 | Shimada et al. . |
| 4,518,753 | 5/1985 | Richards et al. . |
| 4,560,817 | 12/1985 | Bobsein et al. . |
| 4,595,749 | 6/1986 | Hoxmeier . |
| 4,730,031 | 3/1988 | Sato et al. . |
| 4,753,991 | 6/1988 | Bronstert . |
| 4,855,509 | 8/1989 | Dave et al. . |
| 4,857,615 | 8/1989 | Bronn et al. . |
| 4,857,618 | 8/1989 | Silver et al. . |
| 4,866,120 | 9/1989 | Rudnick et al. . |
| 4,906,691 | 3/1990 | Joseph et al. . |
| 4,980,421 | 12/1990 | Teramoto et al. . |
| 4,994,526 | 2/1991 | Peters . |
| 4,994,532 | 2/1991 | Hawkins et al. . |
| 4,996,266 | 2/1991 | Bronn et al. . |
| 5,039,755 | 8/1991 | Chamberlain et al. . |
| 5,081,191 | 1/1992 | Quirk .................... 525/294 |
| 5,166,277 | 11/1992 | Goodwin et al. . |

FOREIGN PATENT DOCUMENTS

| 793660-Q | 1/1973 | Belgium . |
| 209956 | 1/1987 | European Pat. Off. . |
| 0334042 | 9/1989 | European Pat. Off. . |
| 147247 | 5/1979 | Fed. Rep. of Germany . |
| 208470A | 4/1982 | Fed. Rep. of Germany . |
| 3342766A | 11/1982 | Fed. Rep. of Germany . |
| 234682A | 2/1985 | Fed. Rep. of Germany . |
| 234683A | 2/1985 | Fed. Rep. of Germany . |
| 59053515A | 9/1982 | Japan . |
| 59053516A | 9/1982 | Japan . |
| 60052845A | 9/1983 | Japan . |
| 63268703A | 4/1987 | Japan . |
| 62-225514 | 10/1987 | Japan . |
| WO91/12277 | 8/1991 | PCT Int'l Appl. . |

OTHER PUBLICATIONS

Prog. Polymer Science, 15(2), 299-335 (1990).

Primary Examiner—Vasu S. Jagannathan
Attorney, Agent, or Firm—Keith M. Tackett

[57] ABSTRACT

Hydrogenated butadiene polymers having terminal silyl groups are prepared from a (4-vinylphenylene)dimethyl(t-butyl)silyl ether which is added to the polymer chain as a silyl ether initiator or an endcapping agent, or both. The silyl groups are then converted to phenolic groups. The polymers are useful in making coatings, sealants, binders, and block copolymers with polyesters, polyamides, and polycarbonates.

5 Claims, No Drawings

BUTADIENE POLYMERS HAVING TERMINAL SILYL GROUPS

BACKGROUND OF THE INVENTION

This invention relates to manufacture of hydrogenated butadiene polymers having terminal silyl groups and use of the polymers to make coatings and other high molecular weight polymers.

Anionic polymerization of conjugated dienes with lithium initiators, such as sec-butyllithium, and hydrogenation of residual unsaturation has been described in many references including Re. U.S. Pat. No. 27,145 which teaches a relationship between the amount of 1,2-addition of butadiene (35% to 55%) and the glass transition temperatures of the hydrogenated butadiene polymers.

The termination of living anionic polymers to form functional end groups is described in U.S. Pat. Nos. 4,417,029, 4,518,753, and 4,753,991. Of particular interest for the present invention are terminal silyl groups which convert to terminal phenolic groups.

For unsaturated 1,3-butadiene polymers it is known that low 1,2-addition is necessary to obtain low viscosity as taught in U.S. Pat. Nos. 4,518,753 and 3,652,732. However, when these polymers are hydrogenated they are crystalline solids. Such a crystalline polymer is available from Mitsubishi and is designated POLYTAIL H polymer which has a melting point of 72° C.

The hydrogenated butadiene polymers are non-crystalline when the 1,2-addition of butadiene is above 30% as described in U.S. Pat. No. 4,020,125. The non-crystalline hydrogenated butadiene polymers are viscous liquids at low molecular weights as described in U.S. Pat. Nos. 4,866,120 and 4,020,125. POLYTAIL HA polymer produced by Mitsubishi and NISSO GI-2000 polymer produced by Nippon Soda are commercial examples of low molecular weight hydrogenated butadiene polymers which have terminal functional groups and 1,2-addition of about of 84%.

It is an object of the present invention to provide hydrogenated butadiene polymers having terminal silyl groups that convert to terminal phenolic groups. It is also an object of the invention to provide low viscosity polymers to make solventless coatings and to make high molecular weight polymers.

SUMMARY OF THE INVENTION

Hydrogenated butadiene polymers having one or more terminal silyl groups are prepared by polymerizing a (4-vinylphenylene) dimethyl(t-butyl) silyl ether at the end of a living butadiene molecule. The silyl groups are converted to phenolic groups. The (4-vinylphenylene)dimethyl(t-butyl) silyl ethers are also useful as a polymerization initiator that results in terminal silyl groups. The hydrogenated butadiene polymers of the invention may be used without solvents at room temperature when the peak molecular weight, as measured by gel permeation chromatography is between 1,000 and 10,000.

DETAILED DESCRIPTION OF THE INVENTION

Anionic polymerization of conjugated diene hydrocarbons with lithium initiators is well known as described in U.S. Pat. No. 4,039,593 and Re. U.S. Pat. No. 27,145 which descriptions are incorporated herein by reference. Polymerization commences with a monolithium, dilithium, or polylithium initiator which builds a living polymer backbone at each lithium site. Typical living polymer structures containing polymerized conjugated diene hydrocarbons are:

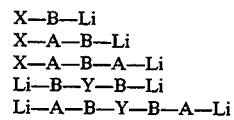

wherein B represents polymerized units of one or more conjugated diene hydrocarbons such as butadiene or isoprene, A represents polymerized units of one or more vinyl aromatic compounds such as styrene, X is the residue of a monolithium initiator such as sec-butyllithium, and Y is the residue of a dilithium initiator such as the diadduct of sec-butyllithium and m-diisopropenylbenzene. Some structures, including those pertaining to polylithium initiators or random units of styrene and a conjugated diene, generally have limited practical utility although known in the art.

The anionic polymerization of the conjugated diene hydrocarbons is typically controlled with structure modifiers such as diethylether or glyme (1,2-diethoxyethane) to obtain the desired amount of 1,4-addition. As described in Re U.S. Pat. No. 27,145 which is incorporated by reference herein, the level of 1,2-addition of a butadiene polymer or copolymer can greatly affect elastomeric properties after hydrogenation.

The 1,2-addition of 1,3-butadiene polymers having terminal functional groups influences the viscosity of the polymers. A 1,2-addition of about 40% is achieved during polymerization at 50° C. with about 6% by volume of diethylether or about 1000 ppm of glyme.

Dilithium initiation with the diadduct of sec-butyllithium (s-BuLi) and m-diisopropenylbenzene also requires presence of a non-reactive coordinating agent such as diethyl ether, glyme, or triethyl amine, otherwise monolithium initiation is achieved. Ether is typically present during anionic polymerization as discussed above, and the amount of ether typically needed to obtain specific polymer structures has been sufficient to provide dilithium initiation.

Antionic polymerization is often terminated by addition of water to remove the lithium as lithium hydroxide (LiOH) or by addition of an alcohol (ROH) to remove the lithium as a lithium alkoxide (LiOR). For polymers having terminal silyl groups, conventional polymer chains are first terminated with a (4-vinyl phenylene) dimethyl (t-butyl)silyl ether, which represents a protected hydroxy-styrene monomer having the structure:

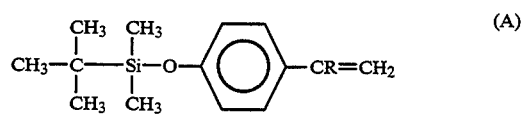

wherein R is hydrogen or an alkyl having up to 10 carbon atoms. The terminal silyl groups are represented by

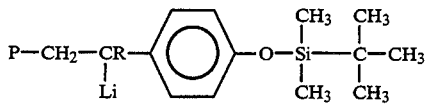

(B)

wherein P represents the polymer pior to removal of lithium.

The silyl ether monomer also forms a polymerization initiator when reacted with an alkyl lithium (R-Li), preferably s-butyllithium. The polymerization initiator has the structure

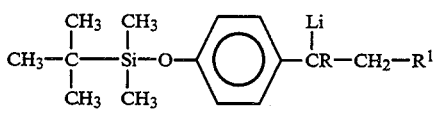

(C)

wherein R is hydrogen or an alkyl group having up to 10 carbon atoms and $R^1$ is an alkyl group having from 2 to 20 carbon atoms. The initiator will produce linear, branched, or star polymers from conjugated dienes using conventional polymerization methods.

Living polymers prepared with the silyl ether initiator can be terminated by reaction with coupling agents such as silicon tetrachloride, dichlorodimethylsilane, or divinylbenzene or with capping agents such as oxiranes (ex. ethylene oxide), carbon dioxide, or the silyl ether monomer as previously described to give multiple terminal groups.

The silyl groups are preferably removed by heating or by reaction with desilylation reagents such as acids or tetra-n-butylammonium fluoride, preferably by reaction with an acid that is used in the hydrogenation catalyst removal step of the preferred process. Desilylation results in terminal phenolic groups.

Hydrogenation of at least 90%, preferably at least 95%, of the unsaturation in the butadiene polymers is achieved with nickel catalysts as described in Re. U.S. Pat. No. 27,145 and U.S. Pat. No. 4,970,254 and U.S. patent application Ser. No. 07/785715 which are incorporated by reference herein. The preferred nickel catalyst is a mixture of nickel 2-ethylhexanoate and triethylaluminum described in more detail in Example 1 below.

Butadiene polymers having two or more terminal functional groups selected from hydroxyl, carboxyl, phenol, epoxy, and amine groups can be used when the peak molecular weights range from 500 to 50,000, preferably 500 to 20,000. These functional groups do not exhibit significant atomic attractions that would otherwise solidify the functionalized polymers.

The polymers of the invention have the conventional utilities such as forming coatings, sealants, and binders. In addition, the butadiene polymers having about two or more terminal phenolic groups can be co-polymerized with conventional compounds during production of polycarbonates, polyesters, and polyamides as described in U.S. Pat. No. 4,994,526 which is incorporated herein by reference.

DETAILED DESCRIPTION OF PREFERRED EMBODIMENTS

Hydrogenated 1,3-butadiene polymers having about two terminal silyl groups per molecule are preferably produced from the (4-vinylphenylene)dimethyl(t-butyl)silyl ether of Equation A wherein R is hydrogen or methyl. Such polymers are low viscosity liquids at room temperature when the peak molecular weight of the polymer ranges between 1,000 and 10,000, as measured by gel permeation chromatography using polystyrene standards, and the 1,2-addition ranges from 40% to 70%.

The following examples illustrate specific embodiments of the invention and do not define the scope of the claims.

The peak molecular weights reported in the examples were measured using gel permeation chromatography calibrated with polystyrene standards having known peak molecular weights. The solvent for all GPC samples was tetrahydrofuran. The polymer microstructure (1,2-additions) was measured by $^{13}C$ and $^1H$ NMR in chloroform solution.

EXAMPLE 1

A linear hydrogenated butadiene polymer having about two terminal silyl groups per molecule, a peak molecular weight of 5,800 ($M_w/M_m=1.13$), as determined by Gel Permeation Chromatography (GPC) using polystyrene standards, and a 1,2-addition of 88%, as determined by a Nuclear Magnetic Resonance (NMR) technique, was prepared as described below. A living butadiene precursor polymer was synthesized using a silyl ether initiator for the polymerization of 1,3-butadiene. The living polymer chain ends were capped using a silyl ether monomer to afford the linear precursor polymer having terminal, silyl functionality. This polymer was hydrogenated using a Ni/Al catalyst and then the silyl groups were converted to terminal phenolic groups.

To synthesize the silyl ether initiator, 250 ml of cyclohexane, 10.0 ml of tetrahydrofuran, and 0.55 g of non-substituted (4-vinylphenylene)dimethyl(t-butyl)silyl ether (SST) (0.002 moles) were combined in a 500 ml glass bottle reactor vessel under an inert, nitrogen atmosphere at about 5° C. Impurities that might interfere with anionic polymerization were removed by titration with a solution of s-BuLi until a faint, persistent yellow color was attained. The purified solution was then treated with 1 equivalent of s-BuLi (0.002 moles) for each equivalent of SST that was present. Reaction at 5° C. for 10 minutes gave a solution of the expected silyl ether initiator.

After formation of the initiator, 0.183 moles of 1,3-butadiene were added under a nitrogen atmosphere at 5° C. The polymerization exotherm was controlled by cooling the reactor to keep the temperature of the reaction mixture at 5° C. After 1.5 hours the polymerization reaction was essentially complete.

The solution containing the living polymer was further reacted, at 5° C., with 0.55 g of the SST (0.002 moles). Reaction was allowed to proceed for 40 minutes, then terminated with 20 ml of MeOH. The polymer was recovered by precipitating the polymer in a 5-fold excess of isopropanol.

Analysis of the polymer by $^1H$ NMR revealed a composition consisting of 2 mol % SST and 98 mol % butadiene with about 90% 1,2 addition.

A 8.95 g aliquot of the butadiene polymer having terminal silyl groups was charged with 586 g of cyclohexene to a one liter autoclave for hydrogenation using a Nickel/Aluminum catalyst. The catalyst (190 ppm Ni) was prepared in advance by reacting nickel 2-ethylhexanoate with triethylaluminum in cyclohexane in amounts sufficient to give a ratio of 2.6 moles of aluminum to 1 mole of nickel. The polymer solution was sparged with hydrogen at 32° C. for 2 minutes. Then 16.14 g of the catalyst was introduced and the reactor was then filled with hydrogen to a pressure of 700 psig. An exothermic hydrogenation reaction ensued.

The temperature of the reaction solution was raised to 80° C. after 1 hour and the reaction continued for a total of 2 hours, 17 minutes.

The hydrogenation catalyst was removed from the polymer cement by acidification with HCl and extraction using 4 separate methanol/acid washes having 5:1 methanol:hydrochloric acid (37% conc. in water). Both $^1$H and $^{13}$C NMR established that at least 98% of the ethylenic unsaturation was hydrogenated.

The hydrogenated butadiene polymer contained phenolic groups following exposure of the silyl groups to HCl in the hydrogenation catalyst removal step.

EXAMPLE 2 (HYPOTHETICAL)

A living hydrogenated butadiene polymer having terminal phenolic groups is prepared as described in Example 1 except that the second addition of SST is replaced by addition of 0.006 moles of divinylbenzene which is mixed with ethylvinylbenzene (about 55 wt % DVB). The resulting polymer has a star structure wherein each arm has a peak molecular weight of about 5,800 prior to conversion of the silyl groups to phenolic groups.

EXAMPLE 3 (HYPOTHETICAL)

A hydrogenated butadiene polymer having terminal phenolic groups is prepared as described in Example 1 except that the ratio of silyl ether initiator to butadiene monomer is adjusted to provide a peak molecular weight of 4,000 and sufficient diethyl ether is added to reduce the 1,2-addition to 50%.

EXAMPLE 4 (HYPOTHETICAL)

A hydrogenated butadiene polymer having terminal phenolic groups is prepared as described in Example 1 except that polymerization is conducted in cyclohexane and the 1,2-addition is reduced to 15%.

We claim:
1. A polymer, comprising:
   polymerized 1,3-butadiene having hydrogenation of at least 90% of the unsaturation; and
   at least one terminal silyl group per molecule, wherein the silyl group forms the structure

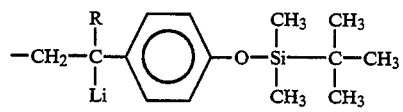

wherein R is hydrogen or an alkyl having up to 10 carbon atoms.
2. The polymer of claim 1, wherein the polymer has a linear structure, at least two silyl groups per molecule, and a 1,2-addition between 30% and 70%.
3. The polymer of claim 2, wherein the polymerized butadiene has a peak molecular weight between 500 and 20,000.
4. The polymer of claim 3, wherein the polymerized butadiene is at least 95% hydrogenated.
5. The polymer of claim 4, wherein the peak molecular weight is between 1,000 and 10,000.

* * * * *